US007771819B2

(12) United States Patent
Fukuda et al.

(10) Patent No.: US 7,771,819 B2

(45) Date of Patent: Aug. 10, 2010

(54) MULTILAYER INSULATED WIRE AND TRANSFORMER MADE USING THE SAME

(75) Inventors: Hideo Fukuda, Tokyo (JP); Yong Hoon Kim, Tokyo (JP); Noriyoshi Fushimi, Tokyo (JP); Isamu Kobayashi, Tokyo (JP); Minoru Saito, Tokyo (JP); Makoto Onodera, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/416,169

(22) Filed: May 3, 2006

(65) Prior Publication Data

US 2006/0194051 A1 Aug. 31, 2006

Related U.S. Application Data

(63) Continuation of application No. PCT/JP2005/008390, filed on Apr. 26, 2005.

(30) Foreign Application Priority Data

Apr. 28, 2004 (JP) ............................ 2004-134508

(51) Int. Cl.
*B32B 15/02* (2006.01)
*H01B 7/17* (2006.01)

(52) U.S. Cl. .................. 428/383; 428/379; 174/120 R; 174/120 C; 174/120 SR

(58) Field of Classification Search ....................... None
See application file for complete search history.

(56) References Cited

U.S. PATENT DOCUMENTS 5,241,880 A * 9/1993 Mizobata et al. ........... 74/502.5
5,358,786 A * 10/1994 Ishikawa et al. ............ 428/380
5,521,009 A * 5/1996 Ishikawa et al. ............ 428/375
5,606,152 A 2/1997 Higashiura et al.
6,066,806 A 5/2000 Higashiura et al.
6,212,063 B1 4/2001 Johnson et al.
6,645,623 B2 * 11/2003 Dean et al. .................. 428/379

(Continued)

FOREIGN PATENT DOCUMENTS

EP 1234855 A1 8/2002

(Continued)

OTHER PUBLICATIONS

TW Office Action, Appl. No. 94113182, Mar. 24, 2010, pp. 1-3, including partial English translation.

*Primary Examiner*—Jill Gray
(74) *Attorney, Agent, or Firm*—Birch, Stewart, Kolasch & Birch, LLP

(57) ABSTRACT

A multilayer insulated wire has a conductor and two or more extrusion-insulating layers to cover the conductor, wherein at least one layer of the insulating layers other than an innermost layer is formed by a resin mixture containing a polyphenylene sulfide resin (A) as a continuous phase and an olefin-based copolymer ingredient (B) as a dispersed phase, or wherein at least one layer of the insulating layers other than an innermost layer is formed by a resin mixture containing a polyphenylene sulfide resin (A) as a continuous phase, and an olefin-based copolymer ingredient (B) and a polyamide (E) as a dispersed phase; a transformer is made by the multilayer insulated wire.

22 Claims, 2 Drawing Sheets

U.S. PATENT DOCUMENTS

| | | | | |
|---|---|---|---|---|
| 6,805,956 | B2 * | 10/2004 | Dean et al. | 428/379 |
| 7,087,843 | B2 * | 8/2006 | Ishii et al. | 174/110 R |

FOREIGN PATENT DOCUMENTS

| | | | | |
|---|---|---|---|---|
| EP | 1331648 | A2 | | 7/2003 |
| EP | 1394818 | A1 | * | 3/2004 |
| EP | 1653482 | A1 | * | 5/2006 |
| JP | 3-56112 | U | | 5/1991 |
| JP | 5-147178 | A | | 6/1993 |
| JP | 6-223634 | A | | 8/1994 |
| JP | 10-67966 | A | | 3/1998 |
| JP | 10-125140 | A | | 5/1998 |
| JP | 10-134642 | A | | 5/1998 |
| KR | 1992-04513 | | | 3/1992 |
| TW | 349230 | | | 1/1999 |
| WO | WO 99/19885 | A1 | | 4/1999 |
| WO | WO 02/099821 | A1 | | 12/2002 |
| WO | WO 02/099821 | A1 | * | 12/2002 |
| WO | WO 03/012798 | A1 | | 2/2003 |

* cited by examiner

MULTILAYER INSULATED WIRE AND TRANSFORMER MADE USING THE SAME

This application is a Continuation of copending PCT International Application No. PCT/JP2005/008390 filed on Apr. 26, 2005, which designated the United States, and on which priority is claimed under 35 U.S.C. §120. This application also claims priority under 35 U.S.C. §119(a) on Patent Application No(s). 2004-134508 filed in Japan on Apr. 28, 2004. The entire contents of each of the above documents is hereby incorporated by reference.

TECHNICAL FIELD

The present invention relates to a multilayer insulated wire in which insulating layers comprises two or more extrusion-coating layers. Further, the present invention relates to a transformer in which said multilayer insulated wire is used.

BACKGROUND ART

The construction of a transformer is prescribed by IEC (International Electrotechnical Communication) Standards Pub. 950 and the like. That is, these standards provide that at least three insulating layers are to be formed between primary and secondary windings in a winding, subject that an enamel film covering a conductor of a winding is not admitted as an insulating layer, and that the thickness of an insulating layer is to be 0.4 mm or more. The standards also provide that the creeping distance between the primary and secondary windings, which varies depending on the applied voltage, is to be 5 mm or more, and that the transformer withstands a voltage of 3,000 V applied between the primary and secondary sides for one minute or more, and the like.

According to the standards, a conventional transformer has a structure like that illustrated in the cross-section shown in FIG. 2. In the structure, an enameled primary windings 24 (a conductor: 24*a*, an enamel coating: 24*b*) is wound around a bobbin 22 on a ferrite core 21, in such a manner that insulating barriers 23, to secure the creeping distance, are arranged individually on the opposite sides of the peripheral surface of the bobbin. An insulating tape 25 (a first layer 25*c*, a second layer 25*b*, and a third layer 25*a*) is wound for at least three turns on the primary winding 24; additional insulating barriers 23, to secure the creeping distance, are arranged on the insulating tape, and an enameled secondary winding 26 (a conductor: 26*a*, an enamel coating: 26*b*) is then wound around the insulating tape. Further, an insulating tape 27 is wound thereon.

Recently, a transformer having a construction that includes neither the insulating barriers 23 nor the insulating tape layer 25, as shown in FIG. 1, has started to be used in place of the transformer having the construction shown in FIG. 2. The transformer shown in FIG. 1 has an advantage over that shown in FIG. 2, in that it can be reduced in overall size and dispenses with the winding operation for the insulating tape.

In respect to the transformer shown in FIG. 1, the primary windings (or the secondary windings) have three insulating layers, an innermost layer 14*b* (or an innermost layer 16*b*), an intermediate layer 14*c* (or an intermediate layer 16*c*), and an outermost layer 14*d* (or an outermost layer 16*d*), formed on the outer peripheral surface on a conductor 14*a* (or a conductor 16*a*).

A winding in which an insulating tape is first wound around a conductor to form a first insulating layer (an innermost layer) thereon, and is further wound to form a second insulating layer (an intermediate layer) and a third insulating layer (an outermost layer) in succession, so as to form three insulating layers that are separable from one another, is known. Further, in place of insulating tapes, it is known that fluororesins are sequentially extruded to cover the outer periphery of a conductor to entirely form three insulating layers (see, for example, JU-A-3-56112 ("JU-A" means unexamined published Japanese utility model application)).

In the above-mentioned case of winding an insulating tape, however, because winding the tape is an unavoidable operation, the efficiency of production is extremely low, and thus the cost of the electrical wire is conspicuously increased.

In the above-mentioned case of extrusion of a fluororesin, since the insulating layer is made of the fluororesin, there is the advantage of good heat resistance and high-frequency characteristic. On the other hand, because of the high cost of the resin and the property that when it is pulled at a high shearing speed, the external appearance is deteriorated, it is difficult to increase the production speed, and like the insulating tape, the cost of the electric wire becomes high.

To solve such problems, a multilayer insulated wire has been put into practical use, which is obtained by extruding denatured polyester resins the crystallization of each of which is controlled and a reduction in molecular weight of each of which is suppressed as first and second insulating layers and a polyamide resin as a third insulating layer to cover the outer periphery of a conductor (see, for example, U.S. Pat. No. 5,606,152, JP-A-6-223634 and the like ("JP-A" means unexamined published Japanese patent application)). In association with recent miniaturization of electrical and electric equipment, an influence of heat generation on the equipment has been concerned, so a multilayer insulated wire with improved heat resistance has been proposed, which is obtained by extruding a polyethersulfone resin as an inner layer and a polyamide resin as an outermost layer to cover the outer periphery of a conductor (see, for example, JP-A-10-134642).

However, in association with further miniaturization of electrical and electric equipment, it has been required that an insulated wire involve excellent solvent properties to cope with a solvent treatment after wiring processing in terms of handling, and involve improved heat resistance. At present, no insulated wires satisfying all of those properties have been obtained.

Other and further features and advantages of the invention will appear more fully from the following description, taken in connection with the accompanying drawings.

DISCLOSURE OF INVENTION

Figure 1:
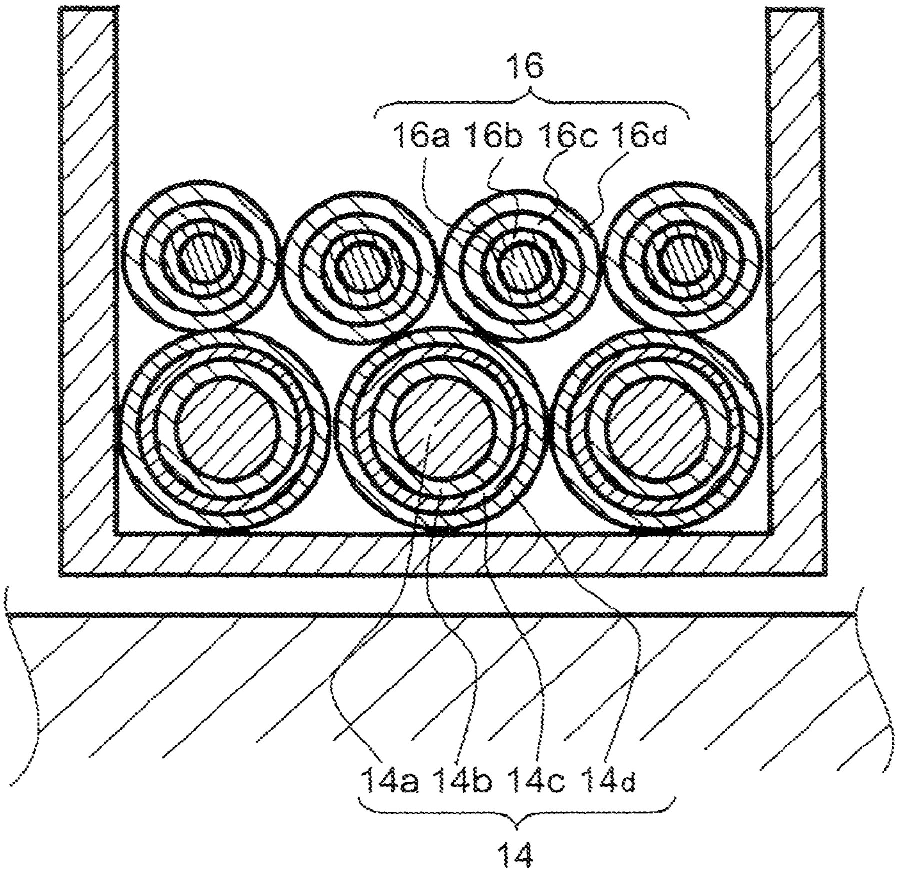
FIG. 1 is a portion cross-sectional view, as a preferred embodiment of the present invention, illustrating a transformer having a structure in which three-layer insulated wires are used as windings.

According to the present invention, there are provided the following means:

(1) A multilayer insulated wire comprises a conductor and two or more extrusion-insulating layers to cover the conductor, wherein at least one layer of the insulating layers other than an innermost layer is formed by a resin mixture containing a polyphenylene sulfide resin (A) as a continuous phase, and an olefin-based copolymer ingredient (B) as a dispersed phase.

(2) The multilayer insulated wire according to (1) includes the insulating layer formed by the resin mixture containing the polyphenylene sulfide resin (A) as the continuous phase, and the olefin-based copolymer ingredient (B) as the dispersed phase, wherein the resin mixture contains 3 to 40 parts by mass of the olefin-based copolymer ingredient (B), and 100 parts by mass of the polyphenylene sulfide resin (A).

(3) The multilayer insulated wire according to (1) includes the insulating layer formed by the resin mixture containing the polyphenylene sulfide resin (A) as the continuous phase, and the olefin-based copolymer ingredient (B) as the dispersed phase, wherein the resin mixture contains 3 to 30 parts by mass of the olefin-based copolymer ingredient (B), and 100 parts by mass of the polyphenylene sulfide resin (A).

(4) The multilayer insulated wire according to (1) includes the insulating layer formed by the resin mixture containing the polyphenylene sulfide resin (A) as the continuous phase, and the olefin-based copolymer ingredient (B) as the dispersed phase, wherein the resin mixture contains 15 to 30 parts by mass of the olefin-based copolymer ingredient (B), and 100 parts by mass of the polyphenylene sulfide resin (A).

(5) A multilayer insulated wire comprises a conductor and two or more extrusion-insulating layers to cover the conductor, wherein at least one layer of the insulating layers other than an innermost layer is formed by a resin mixture containing a polyphenylene sulfide resin (A) as a continuous phase, and an olefin-based copolymer ingredient (B) and a polyamide (E) as a dispersed phase.

(6) The multilayer insulated wire according to (5) includes the insulating layer formed by the resin mixture containing the polyphenylene sulfide resin (A) as the continuous phase, and the olefin-based copolymer ingredient (B) and the polyamide (E) as the dispersed phase, wherein the resin mixture contains 3 to 40 parts by mass in the sum of the olefin-based copolymer ingredient (B) and the polyamide (E), and 100 parts by mass of the polyphenylene sulfide resin (A).

(7) The multilayer insulated wire according to (5) includes the insulating layer formed by the resin mixture containing the polyphenylene sulfide resin (A) as the continuous phase, and the olefin-based copolymer ingredient (B) and the polyamide (E) as the dispersed phase, wherein the resin mixture contains 3 to 30 parts by mass in the sum of the olefin-based copolymer ingredient (B) and the polyamide (E), and 100 parts by mass of the polyphenylene sulfide resin (A).

(8) The multilayer insulated wire according to (5) includes the insulating layer formed by the resin mixture containing the polyphenylene sulfide resin (A) as the continuous phase, and the olefin-based copolymer ingredient (B) and the polyamide (E) as the dispersed phase, wherein the resin mixture contains 15 to 30 parts by mass in the sum of the olefin-based copolymer ingredient (B) and the polyamide (E), and 100 parts by mass of the polyphenylene sulfide resin (A).

(9) The multilayer insulated wire according to any one of (1) to (4) includes at least one layer in an inner side of the insulating layer formed by the resin mixture containing the polyphenylene sulfide resin (A) as the continuous phase and the olefin-based copolymer ingredient (B) as the dispersed phase, wherein the inner-side layer is formed by at least one resin selected from a polyetherimide resin and a polyethersulfone resin.

(10) The multilayer insulated wire according to any one of (5) to (8) includes at least one layer in an inner side of the insulating layer formed by the resin mixture containing the polyphenylene sulfide resin (A) as the continuous phase, and the olefin-based copolymer ingredient (B) and the polyamide (E) as the dispersed phase, wherein the inner-side layer is formed by at least one resin selected from a polyetherimide resin and a polyethersulfone resin.

(11) The multilayer insulated wire according to any one of (1) to (4) includes at least one layer in an inner side of the insulating layer formed by the resin mixture containing the polyphenylene sulfide resin (A) as the continuous phase, and the olefin-based copolymer ingredient (B) as the dispersed phase, wherein the inner-side layer is formed by a polyethersulfone resin.

(12) The multilayer insulated wire according to any one of (5) to (8) includes at least one layer in an inner side of the insulating layer formed by the resin mixture containing the polyphenylene sulfide resin (A) as the continuous phase, and the olefin-based copolymer ingredient (B) and the polyamide (E) as the dispersed phase, wherein the inner-side layer is formed by a polyethersulfone resin.

(13) The multilayer insulated wire according to any one of (1) to (4) includes at least one layer in an inner side of the insulating layer formed by the resin mixture containing the polyphenylene sulfide resin (A) as the continuous phase, and the olefin-based copolymer ingredient (B) as the dispersed phase, wherein the inner-side layer is formed by a polyetherimide resin.

(14) The multilayer insulated wire according to any one of (5) to (8) includes at least one layer in an inner side of the insulating layer formed by the resin mixture containing the polyphenylene sulfide resin (A) as the continuous phase, and the olefin-based copolymer ingredient (B) and the polyamide (E) as the dispersed phase, wherein the inner-side layer is formed by a polyetherimide resin.

(15) The multilayer insulated wire according to any one of (1) to (8) includes at least one layer in an inner side of the insulating layer formed by the resin mixture containing the polyphenylene sulfide resin (A) as the continuous phase, and the olefin-based copolymer ingredient (B) as the dispersed phase, or formed by the resin mixture containing the polyphenylene sulfide resin (A) as the continuous phase, and the olefin-based copolymer ingredient (B) and the polyamide (E) as the dispersed phase, wherein the inner-side layer is formed by a resin dispersion obtained by mixing 10 to 100 parts by mass of at least one resin (D) selected from a polycarbonate resin, a polyarylate resin, a polyester resin, and a polyamide resin, with 100 parts by mass of at least one resin (C) selected from a polyetherimide resin and a polyethersulfone resin.

(16) The multilayer insulated wire according to any one of (1) to (4), (9), (11), (13), and (15) includes the insulating layer formed by the resin mixture containing the polyphenylene sulfide resin (A) as the continuous phase, and the olefin-based copolymer ingredient (B) as the dispersed phase, wherein the resin mixture contains the polyphenylene sulfide resin (A) as the continuous phase and the olefin-based copolymer ingredient (B) having an average particle size in the range of from 0.01 to 5 μm as the dispersed phase.

(17) The multilayer insulated wire according to any one of (5) to (8), (10), (12), and (14) includes the insulating layer formed by the resin mixture containing the polyphenylene sulfide resin (A) as the continuous phase, and the olefin-based copolymer ingredient (B) and the polyamide (E) as the dispersed phase, wherein the resin mixture contains the polyphenylene sulfide resin (A) as the continuous phase, and the olefin-based copolymer ingredient (B) having an average particle size in the range of from 0.01 to 5 μm as the dispersed phase.

(18) The multilayer insulated wire according to any one of (1) to (17), wherein the polyphenylene sulfide resin (A) has an initial value of tan δ (loss modulus/storage modulus) of 1.5 or more in nitrogen, at 1 rad/s, and at 300° C.

(19) The multilayer insulated wire according to any one of (1) to (18), wherein the olefin-based copolymer ingredient (B) is a copolymer having an epoxy group-containing compound portion or a carboxylic anhydride group-containing compound portion.

(20) The multilayer insulated wire according to any one of the items (1) to (18), wherein the olefin-based copolymer ingredient (B) is a copolymer comprising an olefin portion, and an epoxy group-containing compound portion or a carboxylic anhydride group-containing compound portion.

(21) The multilayer insulated wire according to any one of (1) to (18), wherein the olefin-based copolymer ingredient (B) is a copolymer comprising an olefin portion and an unsaturated glycidyl carboxylate portion.

(22) The multilayer insulated wire according to any one of (1) to (18), wherein the olefin-based copolymer ingredient (B) is a copolymer comprising: at least one of an acrylic portion and a vinyl portion, an olefin portion, and an epoxy group-containing compound portion or carboxylic anhydride group-containing compound portion.

(23) The multilayer insulated wire according to any one of (1) to (18), wherein the olefin-based copolymer ingredient (B) is a copolymer comprising: at least one of an acrylic portion and a vinyl portion, an olefin portion, and an unsaturated glycidyl carboxylate portion.

(24) The multilayer insulated wire according to any one of (1) to (23) comprises the resin mixture containing the polyphenylene sulfide resin (A) as the continuous phase, and the olefin-based copolymer ingredient (B) as the dispersed phase, wherein the resin mixture has an initial value of tan δ (loss modulus/storage modulus) of 1.5 or more in nitrogen, at 1 rad/s, and at 300° C.

(25) The multilayer insulated wire according to (15), wherein the resin (C) is a polyethersulfone resin.

(26) The multilayer insulated wire according to (15), wherein the resin (C) is a polyetherimide resin.

(27) The multilayer insulated wire according to (15), wherein the resin (C) is a polycarbonate resin.

(28) The multilayer insulated wire according to (15), wherein the resin (C) is a polyethersulfone resin, and the resin (D) is a polycarbonate resin.

(29) The multilayer insulated wire according to (15), wherein the resin dispersion is obtained by mixing 10 to 70 parts by mass of the resin (D) and 100 parts by mass of the resin (C).

(30) A transformer, wherein the multilayer insulated wire according to any one of (1) to (29) is used.

BEST MODE FOR CARRYING OUT THE INVENTION

The present invention is explained in detail below.

The multilayer insulated wire of the present invention has two or more insulating layer, or preferably has three insulating layers.

The multilayer insulated wire of the present invention has preferably at least one insulating layer other than an innermost layer, more preferably an outermost insulating layer, which is formed by a resin mixture containing a polyphenylene sulfide resin (A) as a continuous phase and an olefin-based copolymer ingredient (B) as a dispersed phase, or an olefin-based copolymer ingredient (B) and a polyamide (E) as a dispersed phase, so the multilayer insulated wire may have heat resistance and chemical resistance. The polyphenylene sulfide resin (A) used in the present invention is preferably a polyphenylene sulfide resin having a low degree of cross-linking because the resin provides a good appearance when used as a coating layer of the multilayer insulated wire. However, unless resin properties are impaired, a cross-linkable polyphenylene sulfide resin may be used in combination, or a cross-linking component, a branching component, or the like may be incorporated into a polymer.

The polyphenylene sulfide resin having a low degree of cross-linking has an initial value of tan δ (loss modulus/storage modulus) of preferably 1.5 or more, or most preferably 2 or more in nitrogen, at 1 rad/s, and at 300° C. There is no particular upper limit on the value of tan δ. The value of tan δ is generally 400 or less, but may be larger than 400. The value of tan δ, in the present invention, may be easily evaluated from time dependence measurement of a loss modulus and a storage modulus in nitrogen, at the above constant frequency, and at the above constant temperature. In particular, the value of tan δ may be calculated from an initial loss modulus and an initial storage modulus immediately after the start of the measurement. A sample having a diameter of 24 mm and a thickness of 1 mm may be used for the measurement. An example of a device capable of performing such measurement includes an Advanced Rheometric Expansion System (trade name, abbreviated as ARES) manufactured by TA Instruments Japan. The above value of tan δ may serve as an indication of a level of cross-linking. A polyphenylene sulfide resin having a too small value of tan δ hardly provides sufficient flexibility and hardly provides a good appearance.

The olefin-based copolymer ingredient (B) used in the present invention for the purpose of improving the flexibility of the polyphenylene sulfide resin (A) is preferably a copolymer comprises an olefin portion and an epoxy group- or carboxylic anhydride group-containing compound portion. The resin (B) is also preferably in a copolymer comprising at least one component among an acrylic portion and a vinyl portion, an olefin portion, and an epoxy-group-containing compound portion or carboxylic anhydride group-containing compound portion.

Examples of the olefin component to constitute the copolymer (B) include ethylene, propylene, butene-1, pentene-1,4-methylpentene-1, isobutylene, hexene-1, decene-1, octene-1, 1,4-hexadiene, dicyclopentadiene, and the like. Preferably, use may be made of ethylene, propylene and butene-1. These components may be used singly or in combination of two or more kinds thereof. Further, examples of the acrylic component include acrylic acid, methyl acrylate, ethyl acrylate, n-propyl acrylate, isopropyl acrylate, n-butyl acrylate, t-butyl acrylate, isobutyl acrylate, methyl methacrylate, ethyl methacrylate, butyl methacrylate, and the like. Examples of the vinyl component include vinyl acetate, vinyl propionate, vinyl butyrate, vinyl chloride, vinyl alcohol, styrene, and the like. Among these, methyl acrylate and methyl methacrylate are preferable. Further, these components can be used singly or in combination of two or more kinds thereof.

As the epoxy-group-containing compound to form the copolymer (B) include, for example, a glycidyl ester compound of an unsaturated carboxylic acid represented by following formula (1):

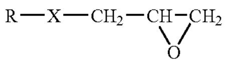

formula (1)

wherein R represents an alkenyl group having 2 to 18 carbon atoms, and X represents a carbonyloxy group.

Representative examples of the unsaturated carboxylic acid glycidyl ester include glycidyl acrylate, glycidyl methacrylate, itaconic acid glycidyl ester, and the like, preferably it is glycidyl methacrylate.

Representative examples of the above copolymer ingredient (B) include an ethylene/glycidyl methacrylate copolymer, an ethylene/glycidyl methacrylate/methyl acrylate terpolymer, an ethylene/glycidyl methacrylate/vinyl acetate terpolymer, an ethylene/glycidyl methacrylate/methyl acrylate/vinyl acetate quarterpolymer, and the like. Of these, an ethylene/glycidyl methacrylate copolymer, an ethylene/glycidyl methacrylate/methyl acrylate terpolymer are preferable. There are commercially available resins including, for example, Bondfast (trade name, manufactured by Sumitomo Chemical Co., Ltd.) and LOTADER (trade name, manufactured by ATOFINA Chemicals, Inc.).

In addition, examples of the carboxylic anhydride group-containing compound component constituting the olefin-based copolymer ingredient (B) include methylmaleic anhydride, maleic anhydride, and methylmaleic anhydride. Each of them is used alone, or two or more of them are used in combination. Derivatives of them can also be used, but out of those, maleic anhydride is more preferably used. Examples of the olefin-based copolymer component (B) include an ethylene/maleic anhydride copolymer, an ethylene/methyl acrylate/maleic anhydride tertiary copolymer, an ethylene/methyl methacrylate/maleic anhydride tertiary copolymer, an ethylene/ethyl acrylate/maleic anhydride tertiary copolymer, and an ethylene/ethyl methacrylate/maleic anhydride tertiary copolymer. Of those, an ethylene/ethyl acrylate/maleic anhydride tertiary copolymer is particularly preferable, and an example of a commercially available one includes Bondine (trade name, manufactured by Sumitomo Chemical Co., Ltd.).

Further, the copolymer (B) for use in the present invention may be any of a block copolymer, a graft copolymer, a random copolymer, or an alternating copolymer. The resin (B) may be, for examples, a random copolymer of ethylene/propylene, a random copolymer of ethylene/propylene/diene, a block copolymer of ethylene/diene/ethylene, a block copolymer of propylene/diene/propylene, a block copolymer of styrene/diene/ethylene, a block copolymer of styrene/diene/propylene, and a block copolymer of styrene/diene/styrene, partially epoxidated products of a diene component thereto, or graft-modified products of an epoxy-containing compound such as glycidyl methacrylic acid or of carboxylic anhydride group-containing compound. Further, preferable examples of these copolymers also include hydrogenated products of the copolymers, in order to enhance heat stability.

In the present invention, the content of the olefin-copolymer ingredient (B) is preferably 3 to 40 parts by mass, more preferably 3 to 30 parts by mass, particularly preferably 15 to 30 parts by mass, to 100 mass parts of the polyphenylene sulfide resin (A). If this content is too small, it is difficult to exhibit the effects of the present invention. On the other hand, if too large, heat resistance is apt to be degraded, which is non-preferable. In the present invention, one, or two or more kinds of the olefin-based copolymer component (B) may be used.

With regard to the presence or absence of crazing after a solvent treatment, although it may depend on the thickness of the coating layer or treatment conditions, a content of the olefin-based copolymer component (B) of less than 15 parts by mass may cause crazing in severe alcohols against crazing such as ethanol and/or isopropyl alcohol, even though it shows resistance to crazing against xylene and/or styrene. Accordingly, a content of the olefin-based copolymer component (B) is preferably 15 parts by mass or more to avoid crazing even in severe alcohols against crazing.

In addition, in the present invention, for improving the chemical resistance of the polyphenylene sulfide resin (A), the mixture of the olefin-based copolymer component (B) and the polyamide (E) are preferably added. The content of the mixture of the olefin-based copolymer component (B) and the polyamide (E) is preferably of from 15 to 30 parts by mass, to improve crazing resistance against severe alcohols such as isopropyl alcohol. Although there is no particular limitation of a mass ratio between olefin-based copolymer component (B) and the polyamide (E), it is more preferable that the content of the olefin-based copolymer component (B) is of from 5 to 20 parts by mass and/or that the content of the polyamide (E) is from 10 to 25 parts by mass.

Further, as the polyamide resins, those produced by usual methods, as raw materials, diamines, dicarboxylic acids, etc., can be used. As commercially available resins, for example, nylon 6,6, such as AMILAN (trade name, manufactured by Toray Industries, Inc.), ZYTEL (trade name, manufactured by E.I. du Pont De Nemours & Co., Inc.), MARANYL (trade name, manufactured by Unitika Ltd.); nylon 4,6, such as Unitika NYLON 46 (trade name, manufactured by Unitika Ltd.); and nylon 6, T, such as ARLEN (trade name, manufactured by Mitsui Petrochemical Industries, Ltd.), and the like can be mentioned.

In the present invention, in order to uniformly disperse the olefin-based copolymer ingredient into the polyphenylene sulfide resin, as a compatibilizer, a usual epoxy curing catalyst such as a tertiary amine, a quaternary ammonium salt, or a tertiary phosphine may be used. For example, it includes triphenyl phosphate, dimethyl lauryl amine, dimethyl stearyl amine, N-butyl morpholine, N,N-dimethylcyclohexylamine, benzyl dimethyl amine, pyridine, dimethylamino-4-pyridine, methyl-1-imidazole, tetramethyl-ethylenediamine, tetramethylene guanidine, triethylene diamine, tetramethylene hydrazine, N,N-dimethylpiperazine, tetramethylammonium chloride, benzyl trimethylammonium chloride, tetra-N-butylammonium bromide, tetramethylammonium bromide, tetraethylammonium bromide, cetyl trimethylammonium bromide, tetrapropylammonium bromide, and the like.

In addition, other heat resistant thermoplastic resin, thermoplastic elastomer, additive to be generally used, inorganic filler, processing aid, colorant, and the like may be added unless solderability and heat resistance are impaired. The resin mixture containing the polyphenylene sulfide resin (A) as the continuous phase and the olefin-based copolymer ingredient (B) as the dispersed phase can be produced by melting and mixing by using an ordinary biaxial extruder, a mixing kneader such as a kneader, a cokneader, and the like. In addition, it is preferable to suppress the progress of ramification or of a cross-linking reaction due to oxidation inside a kneader. To achieve this, a method involving nitrogen replacement may be adopted. To provide the coating layer of the multilayer insulated wire with sufficient flexibility and a good appearance, the resin mixture has an initial value of tan δ (loss modulus/storage modulus) of preferably 1.5 or more, or more preferably 2 or more in nitrogen, at 1 rad/s, and at 300° C. There is no particular upper limit on the value of tan δ. The value of tan δ is generally 400 or less, but may be larger than 400. The preferable range of tand δ mentioned above is similar to that of polyamide (E).

In the present invention, the average particle size of the dispersed phase formed by the olefin-based copolymer ingredient (B) is in the range of preferably from 0.01 to 5 μm, or particularly preferably from 0.01 to 4 μm. If an average particle size is too small, it is not preferable because an effect of the present invention is hardly exerted. If an average particle size is too large, it is not preferable because abrasion resistance or solvent resistance may deteriorate. The preferable range of the average particle size mentioned above is similar to that of polyamide (E).

At the time of wire coating processing, a method involving nitrogen replacement may be adopted in order to suppress the progress of ramification or of a cross-linking reaction due to oxidation inside a molding machine.

In addition, an annealing treatment may be performed as required after molding processing. Annealing may provide an increased degree of crystallinity and improved chemical resistance.

In addition, an arbitrary polyethersulfone resin can be selected as a resin having high heat resistance to be used for an insulating layer in an inner side of the insulating layer formed by the resin mixture containing the polyphenylene sulfide resin (A) as the continuous phase and the olefin-based copolymer ingredient (B) as the dispersed phase. A resin represented by following formula (2) is preferably used:

formula (2)

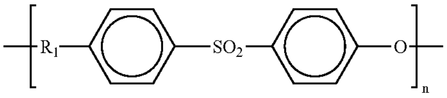

wherein $R_1$ represents a single bond or $—R_2—O—$. $R_2$ represents a phenylene group, a biphenylene group, or a group represented by following formula (3), and the group represented by $R_2$ may further have a substituent. n represents a positive integer large enough to give the polymer.

Formula (3) is shown as follows:

formula (3)

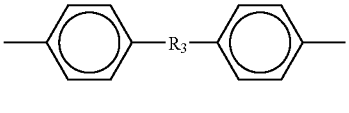

wherein $R_3$ represents an alkylene group such as $—C(CH_3)_2—$ or $—CH_2—$.

These resins may be produced by usual methods. For example, a manufacturing method in which a dichlorodiphenyl sulfone, bisphenol S, and potassium carbonate are reacted in a high-boiling solvent, can be mentioned. As commercially available resins, for example, VICTREX PES SUMIKAEXCEL PES (trade names, manufactured by Sumitomo Chemical Co., Ltd.), RADEL A RADEL R (trade names manufactured by Amoco), and the like can be mentioned.

Other heat resistant resins, additive to be generally used, inorganic filler, processing aid, colorant, and the like may be added unless heat resistance is impaired.

The insulating layers of the multilayer insulated wire are preferably constituted by extruding two or more layers each formed by the polyethersulfone resin to cover the conductor because heat resistance is ensured. In addition, at the time of extruding the polyethersulfone resin to cover the conductor, the conductor may be preliminarily heated as required. When the conductor is preliminarily heated, the temperature for the preliminary heating is preferably set from 120 to 140° C. or lower. The preliminary heating may provide improved adhesiveness between the conductor and the polyethersulfone resin.

In addition, an arbitrary polyetherimide resin can be selected as a resin having high heat resistance to be used for an insulating layer in an inner side of the insulating layer formed by the resin mixture containing the polyphenylene sulfide resin (A) as the continuous phase and the olefin-based copolymer ingredient (B) as the dispersed phase. A resin represented by the following formula (2) is preferably used:

formula (4)

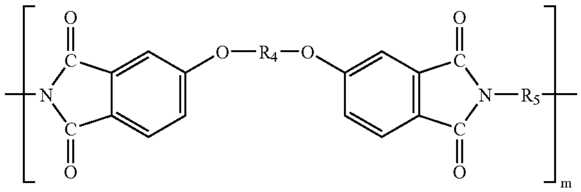

wherein $R_4$ and $R_5$ each represents a phenylene group, a biphenylene group, a group represented by following formula (A), or a group represented by following formula (5). The group represented by $R_4$ and $R_5$ each may further have a substituent. m represents a positive integer large enough to give the polymer.

Formula (A) and (5) are shown as follows:

formula (A)

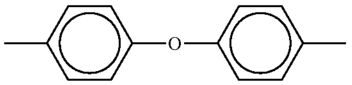

formula (5)

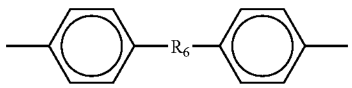

wherein $R_6$ represents an alkylene group preferably having from 1 to 7 carbon atoms (such as preferably methylene, ethylene, and propylene (particularly preferably isopropylidene)), or a naphthylene group, each of which may have a substituent, such as an alkyl group (e.g. methyl and ethyl).

As commercially available resins, for example, ULTEM (trade name, manufactured by GE Plastics Ltd.) and the like can be mentioned.

Meanwhile, when the insulating layers are each requested to have solderability, it is preferable that at least one insulating layer is formed by a resin dispersion of the resins (C)

(polyethersulfone resins and/or polyetherimide resins) and resins (D) (polycarbonate resins, polyester resins, polyarylate resins, and/or polyamide resins).

The polyetherimide resins may be produced by the usual methods, for example, which may be synthesized by solution polycondensation of 2,2'-bis[3-(3,4-dicarboxyphenoxy)-phenyl]propanediacid anhydride and 4,4'-diaminodiphenyl-methane in ortho-dichlorobenzene as a solvent.

In the present invention, by mixing the heat-resistant resin (C) and the resin (D), solderability may be given therein.

The above-mentioned polycarbonate resins, polyarylate resins, polyester resins, and/or polyamide resins used as the resin (D) are not particularly limited. As the polycarbonate resins, use can be made of those produced by a usual method using, for example, dihydric alcohols, phosgene, etc., as raw materials. As commercially available resins, LEXAN (trade name, manufactured by GE Plastics Ltd.), PANLITE (trade name, manufactured by Teijin Chemicals Ltd.) and UPIRON (trade name, manufactured by Mitsubishi Gas Chemical Co., Inc.) can be mentioned. As the polycarbonate resins for use in the multilayer insulated wire of the present invention, for example polycarbonate resins represented by formula (3) may be used:

formula (6)

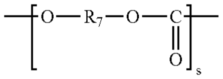

wherein $R_7$ represents a phenylene group, a biphenylylene group, an group represented by formula (A) shown above, a group represented by following formula (7), or the like. The group represented by $R_7$ may further have a substituent. s represents a positive integer large enough to give the polymer.

Formula (7) is shown as follows:

formula (7)

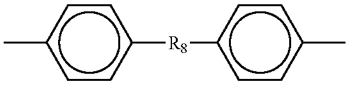

wherein $R_8$ represents an alkylene group preferably having from 1 to 7 carbon atoms (such as preferably methylene, ethylene, or propylene (particularly preferably isopropylidene)), or a naphthylene group, each of which may have a substituent, such as an alkyl group (e.g. methyl and ethyl).

Further, the polyarylate resins are generally produced by the interfacial polymerization method, in which, for example, bisphenol A dissolved in an aqueous alkali solution, and a terephthalic chloride/isophthalic chloride mixture dissolved in an organic solvent, such as a halogenated hydrocarbon, are reacted at normal (room) temperatures, to synthesize the resin. As commercially available resins, for example, U-POLYMER (trade name, manufactured by Unitika Ltd.), and the like can be mentioned.

Further, the polyester resins produced in usual methods by raw materials of divalent alcohols and divalent aromatic carboxylic acids, etc., can be used. Commercially available resins include, for example, polyethylene terephthalate (PET)-series resins, such as VYLOPET (trade name, manufactured by Toyobo Co., Ltd.), BELLPET (trade name, manufactured by Kanebo, Ltd.); TEIJIN PET (trade name, manufactured by TEIJIN LTD.); polyethylene naphthalate (PEN)-series resins, such as TEIJIN PEN (trade name, manufactured by TEIJIN LTD.); and polycyclohexane dimethylene terephthalate (PCT))-series resins, such as Ektar (trade name, manufactured by Toray Industries, Inc.).

Further, as the polyamide resins, those produced by usual methods, as raw materials, diamines, dicarboxylic acids, etc., can be used. As commercially available resins, for example, nylon 6,6, such as AMILAN (trade name, manufactured by Toray Industries, Inc.), ZYTEL (trade name, manufactured by E.I. du Pont De Nemours & Co., Inc.), MARANYL (trade name, manufactured by Unitika Ltd.); nylon 4,6, such as Unitika NYLON 46 (trade name, manufactured by Unitika Ltd.); and nylon 6, T, such as ARLEN (trade name, manufactured by Mitsui Petrochemical Industries, Ltd.), can be mentioned.

In the present invention, the amount of the resin (D) is preferably 10 parts by mass or more, to 100 parts by mass of the resin (C). When the amount of the resin (D) is too few, heat resistance may be increased but solderability may not be obtained. The upper limit of the amount of the resin (D) to be mixed is determined taking the level of the required heat resistance into account, and it is preferably 100 parts by mass or less. When a particularly high level of heat resistance is to be realized while keeping high solderability, the amount of the resin (D) to be mixed is preferably 70 parts by mass or less, and a preferable range wherein both of these properties are particularly well balanced is that the amount of the resin (D) to be mixed is particularly preferably from 20 to 50 parts by mass, to 100 parts by mass of the resin (C).

The above resin mixture may be prepared by melting and mixing by using a usual twin-screw extruder, a kneader, a co-kneader, and the like. The mixing temperature of the resins to be mixed has an influence on the direct solderability, and the higher the mixing temperature of the mixer is set at, the better the resulting direct solderability is. The mixing temperature is preferably set at from 320 to 400° C., particularly preferably at from 360 to 400° C.

The other heat resistant thermal plasticity resins, additives generally to be used, inorganic fillers, processing aids, and coloring agents may be added.

The insulating layers of the multilayer insulated wire are preferably constituted by extruding two or more layers each formed by the resin mixture to cover the conductor because a good balance between heat resistance and solderability can be ensured. In addition, at the time of extruding the resin mixture to cover the conductor, it is not preferable to preliminarily heat the conductor in order to obtain good solderability. Even if the conductor is preliminarily heated, the temperature for the preliminary heating is preferably set from 120 to 140° C. This is because: preliminary heating may weaken the adhesiveness between the conductor and the resin mixture coating layer, considerable thermal shrinkage of from 10 to 30% may occur on the resin mixture coating layer in a longitudinal direction at the time of soldering, which may result in synergistically improved solderability.

As the conductor for use in the present invention, a metal bare wire (solid wire), an insulated wire having an enamel film or a thin insulating layer coated on a metal bare wire, a multicore stranded wire (a bunch of wires) comprises intertwined metal bare wires, or a multicore stranded wire comprises intertwined insulated-wires that each have an enamel film or a thin insulating layer coated, can be used. The number of the intertwined wires of the multicore stranded wire (a so-called litz wire) can be chosen arbitrarily depending on the desired high-frequency application. Alternatively, when the number of wires of a multicore wire is large, for example, in a 19- or 37-element wire, the multicore wire (elemental wire)

may be in a form of a stranded wire or a non-stranded wire. In the non-stranded wire, for example, multiple conductors that each may be a bare wire or an insulated wire to form the elemental wire, may be merely gathered (collected) together to bundle up them in an approximately parallel direction, or the bundle of them may be intertwined in a very large pitch. In each case of these, the cross-section thereof is preferably a circle or an approximate circle.

However, as the material of the thin insulating layer, a resin that is itself good in solderability, such as an esterimide-modified polyurethane resin, a urea-modified polyurethane resin, and a polyesterimide resin, may be used, for example, WD-4305 (trade name, manufactured by Hitachi Chemical Co., Ltd.), TSF-200 and TPU-7000 (trade names, manufactured by Totoku Toryo Co.), and FS-304 (trade name, manufactured by Dainichi Seika Co.) may be used. Further, plating of solder or tin to the conductor may be a means of improving the solderability.

In a preferred embodiment of the present invention, the coating layer of the multilayer insulated wire may be produced by: extruding a polyethersulfone resin to cover the outer periphery of a conductor to thereby form a first insulating layer having a desired thickness; extruding a polyethersulfone resin to cover the outer periphery of the first insulating layer to thereby form a second insulating layer having a desired thickness; and extruding a polyphenylene sulfide-based resin mixture to cover the outer periphery of the second insulating layer to thereby form a third insulating layer having a desired thickness. An entire thickness of extrusion-insulating layers, i.e. three layers in this embodiment, thus formed is preferably in the range of 60 to 180 μm. If the overall thickness of the insulating layers is too small, the electrical properties of the resulting heat-resistant multilayer insulated wire may be greatly lowered, and the wire may be impractical in some cases. On the other hand, if the overall thickness of the insulating layers is too large, the solderability may be deteriorated considerably in some cases. More preferably the overall thickness of the extrusion-coating insulating layers is in the range of from 70 to 150 μm. Meanwhile, the thickness of each layer is preferably controlled within the range of from 20 to 60 μm.

As the other preferable embodiment to improve solderability, a multilayer insulated wire having: an insulating layer formed by the polyethersulfone-based resin mixture or the polyetherimide-based resin mixture for the first and/or second layer, and at least one layer formed by the polyphenylene sulfide-based resin mixture in an outer side of the aforementioned insulating layer(s), which may satisfy chemical resistance such as solvent resistance in addition to heat resistance and solderability.

The transformer of the present invention, in which the multilayer insulated wire of the present invention is used, not only satisfies the IEC 950 standards, but the transformer may also be made small in size because of no insulating tape wound. Further, rigorous design requirements may be fulfilled in virtue of its high heat resistance.

Figure 2:
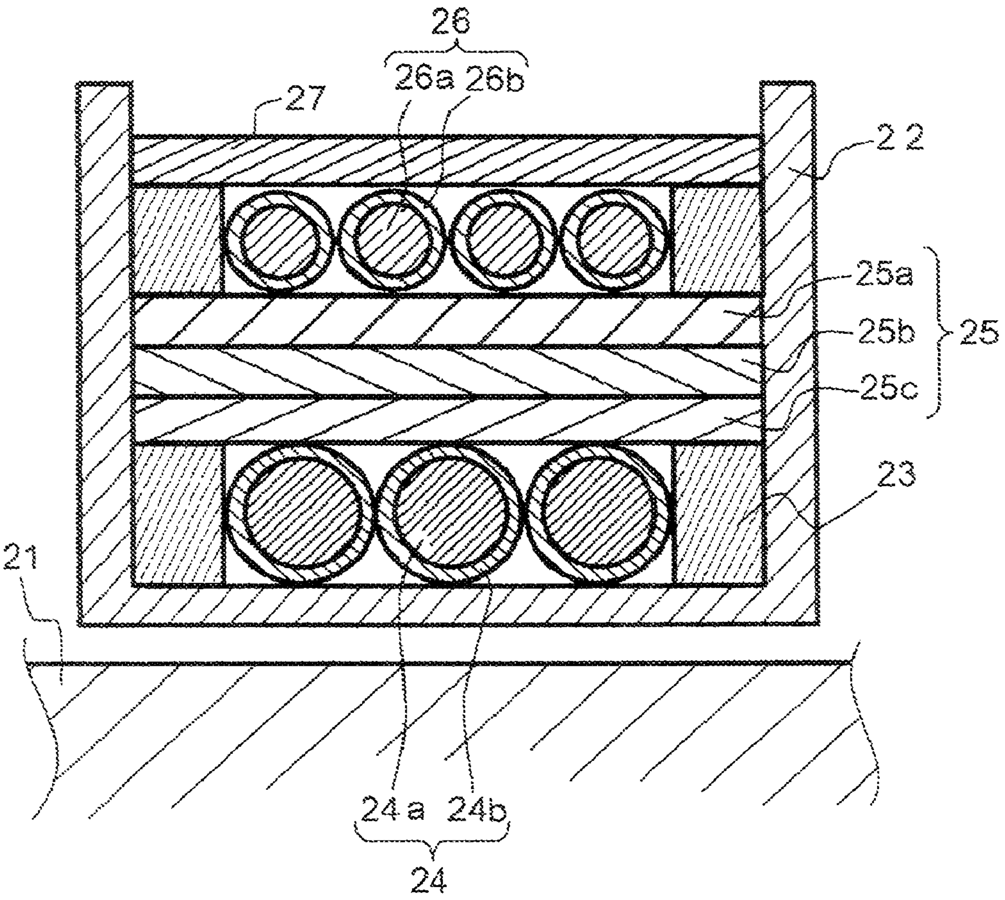
Fig. 2 Prior Art
FIG. 2 is a portion cross-sectional view illustrating a transformer having a conventional structure.

The multilayer insulated wire of the present invention can be used as a winding for any type of transformer, including those shown in FIGS. 1 and 2. In such a transformer, generally a primary winding and a secondary winding are wound in a layered manner on a core, but the multilayer insulated wire of the present invention may be applied to a transformer in which a primary winding and a secondary winding are alternatively wound (see, for example, JP-A-5-152139). In addition, in the transformer of the present invention, the aforementioned multilayer insulated wire may be used for both of the primary winding and the secondary winding, or for one of these windings. In addition, when the multilayer insulated wire of the present invention comprises two layers (for example, when a two-layer insulated wire is used for each of the primary winding and the secondary winding, or an enamel wire is used for one of the windings and a two-layer insulated wire is used for the other), at least one insulating barrier layer can be applied to interposing between both the windings.

According to the present invention, there can be provided a multilayer insulated wire which is excellent in heat resistance and chemical resistance, and which is useful as a winding or lead wire of a transformer to be incorporated into, for example, electrical and electric equipment.

Furthermore, depending on the constitution of an insulating material to be used in each of the insulating layers, there can be provided a multilayer insulated wire having excellent solderability enabling insulating layers to be removed for a short period of time when the insulating layers are immersed in a soldering bath to attach solder to a conductor.

The multilayer insulated wire of the present invention satisfies heat resistance at a sufficient level, and is excellent in solvent resistance and chemical resistance, so there can be provided a wide selection of treatments after winding processing.

In addition, according to the multilayer insulated wire of the present invention, application of a specific resin mixture to at least one insulating layer enables soldering to be directly performed at the time of terminal processing, so the workability of winding processing can be sufficiently improved.

Further, according to the present invention, there can be provided a superior transformer excellent in industrial production and electrical characteristics, with high reliability.

EXAMPLES

The present invention will now be described in more detail with reference to the following examples, but the invention is not limited to these.

Examples

As conductors, were provided bare wires (solid wires) of annealed copper wires of diameter 0.4 mm (referred to “bare wires” in the following tables), and stranded wires, each composed of seven intertwined cores (insulated wires), each made by coating an annealed copper wire of diameter 0.15 mm with Insulating Varnish WD-4305, trade name, manufactured by Hitachi Chemical Co., Ltd., so that the coating thickness of the varnish layer would be 8 μm (referred to “stranded wires” in the following tables). The conductors were respectively coated successively, by extrusion coating, with resin layers having the formulations (compositions are shown in terms of parts by mass; (A) to (E) correspond to those of the components described above, respectively) for extrusion coating and the thicknesses, as shown in Tables 1 to 4, at a given production line speed (shown in the tables), thereby preparing multilayer insulated wire samples 1 to 30 each having a first (inner) layer to a third (outer) layer.

With respect to the third layer among the coating layers, a value of an initial tan δ (1 rad/s, 300° C.) of a resin mixture containing polyphenylene sulfide resin (A) and a dispersed phase is described in the tables, and the average particle diameter (μm) of a dispersed phase is also described in the tables.

The total coating thickness of the coating layers is also described in the tables.

In some case, preliminary heating (pre-heating) of the conductor was carried out in a manner that a conductor was passed through a heating room before extruding resins thereon, and the pre-heating temperature is described in the tables. In a surface treatment of the coated conductors, use was made of a refrigerating machine oil.

(Tests)

With respect to the thus-prepared multilayer insulated wires, the properties were measured and evaluated according to the following test methods:

[A. Heat Resistance]

The heat resistance was evaluated by the following test method, in conformity to Annex U (Insulated wires) of Item 2.9.4.4 and Annex C (Transformers) of Item 1.5.3 of 60950-standards of the IEC standards.

Ten turns of the multilayer insulated wire were wound around a mandrel of diameter 6 mm under a load of 118 MPa (12 kg/$mm^2$). They were heated for 1 hour at 225° C. for Class B (Class F, 240° C.), and then for additional 71 hours at 200° C. for Class B (Class F, 240° C.), and then they were kept in an atmosphere of 25° C. and humidity 95% for 48 hours. Immediately thereafter, a voltage of 3,000 V was applied thereto, for 1 min. When there was no electrical short-circuit, in each of Class B and Class F, it is designated to as "○" in the tables. The judgment was made with the tests carried out with n=5. When electrical short-circuit occurred with n=1, it is designated to as "x" in the tables.

[B. Dielectric Breakdown Voltage]

The dielectric breakdown voltage was measured in accordance with the examination method based on item 2 in JIS C $3003^{-1984}$11. (2). The results are shown in kV units in the tables. A wire with a breakdown voltage lower than 14 kV is insufficient in function of an insulated wire.

[C. Solvent Resistance]

A wire subjected to 20-D winding as winding processing was immersed in any of styrene, xylene, ethanol, or IPA (isopropyl alcohol) solvent for 30 sec. The surface of the sample after drying was observed to judge whether crazing was occurred or not. In the tables, when crazing was observed, it is designated to as "observed", while when no crazing was observed, it is designated to as "not observed". When crack was occurred separately from crazing, it is designated to as "crack". Herein, the term "crazing" is distinguished from "crack", and means vertical creases longitudinally appeared on a stressed wire in a winding process, so insulation characteristics are not directly affected. On the other hand "crack" means cracks resulted from further growth of crazing, so insulation characteristics are considerably lowered.

[D. Solderability]

A length of about 40 mm at the end of the insulted wire was dipped in a molten solder at a temperature of 450° C., and the time (sec) required for the adhesion of the solder to the dipped 30-mm-long part was measured. The shorter the required time is, the more excellent the solderability is. The numerical value shown was the average value of n=3. When the time is in excess of 10 sec, it is not preferable for workability in processing. The time is preferably 5 sec or shorter for a coating thickness of about 100 μm, or is preferably 7 sec or shorter for a thickness of about 180 μm.

[E. Outer Appearance of Insulated Wire]

Outer appearance of the insulated wire was observed by a self-wound wire (1-D winding) with an electron microscope in a magnification ratio of 100 times. In the tables, when superficially rough appearance (i.e. lusterless) or winkles are not observed, it is designated to as "○"; while when superficially rough appearance or winkles are observed, it is designated to as "x".

Here, when no test was carried out, it is designated to as "ND" in the tables; and when no component or ingredient was added to the composition of resins, it is designated to as "-".

In the tables, the abbreviations representing the respective resins to be used are as follows.

PES: SUMIKAEXCEL PES 3600 (manufactured by Sumitomo Chemical Co., Ltd., trade name), a polyethersulfone resin PEI: ULTEM 1000 (manufactured by GE Plastics Ltd., trade name), a polyetherimide resin PC: LEXAN SP-1010 (manufactured by GE. Plastics Ltd., trade name), a polycarbonate resin PAR: U-POLYMER (manufactured by Unitika Ltd., trade name), a polyarylate resin PA: ARLEN AE-4200 (manufactured by Mitsui Chemical Industries, Ltd., trade name), a polyamide resin PPS: DICPPS ML-320-P (manufactured by Dainippon Ink and Chemicals, Incorporated, trade name), a polyphenylene sulfide resin Olefin-based copolymer 1: Bondfast 7M (manufactured by Sumitomo Chemical Co., Ltd., trade name), an ethylene/glycidyl methacrylate/methyl acrylate copolymer resin Olefin-based copolymer 2: Bondfast E (manufactured by Sumitomo Chemical Co., Ltd., trade name), an ethylene/glycidyl methacrylate copolymer resin Olefin-based copolymer 3: Bondine AX8390 (manufactured by Sumitomo Chemical Co., Ltd., trade name), an ethylene/ethyl acrylate/maleic anhydride copolymer resin

APPENDIX A

TABLE 1

| | | Insulated wire sample | | | | | | | |
|---|---|---|---|---|---|---|---|---|---|
| | | 1 | 2 | 3 | 4 | 5 | 6 | 7 | 8 |
| Conductor | | Bare wire | Bare wire | Stranded wire | Bare wire | Bare wire | Bare wire | Bare wire | Bare wire |
| Production line speed [m/min] | | 100 | 100 | 100 | 100 | 100 | 100 | 100 | 100 |
| Preliminary heating temperature [° C.] | | None | None | None | None | None | None | None | 140 |
| First layer | (C) PES | 100 | 100 | 100 | 100 | 100 | — | — | 100 |
| | PEI | — | — | — | — | — | 100 | 100 | — |

TABLE 1-continued

| | | Insulated wire sample | | | | | | | |
|---|---|---|---|---|---|---|---|---|---|
| | | 1 | 2 | 3 | 4 | 5 | 6 | 7 | 8 |
| | (D) PC | — | — | — | — | — | — | — | — |
| | PAR | — | — | — | — | — | — | — | — |
| | PA | — | — | — | — | — | — | — | — |
| | Coating thickness [μm] | 35 | 34 | 35 | 35 | 35 | 35 | 35 | 35 |
| Second layer | (C) PES | 100 | 100 | 100 | 100 | — | — | — | 100 |
| | PPS | — | — | — | — | 100 | 100 | 100 | — |
| | PEI | — | — | — | — | — | — | — | — |
| | (D) PC | — | — | — | — | — | — | — | — |
| | PAR | — | — | — | — | — | — | — | — |
| | PA | — | — | — | — | — | — | — | — |
| | Coating thickness [μm] | 34 | 35 | 35 | 35 | 35 | 35 | 35 | 35 |
| Third layer | (A) PPS | 100 | 100 | 100 | 100 | 100 | 100 | 100 | 100 |
| | (B) Copolymer 1 | 5 | 10 | 10 | 15 | 15 | 15 | 5 | 20 |
| | Copolymer 2 | — | — | — | — | — | — | — | — |
| | Copolymer 3 | — | — | — | — | — | — | — | — |
| | (E) PA | — | — | — | — | — | — | 10 | — |
| | Tanδ (1 rad/s, 300° C.) | 4.2 | 3.9 | 3.9 | 3.7 | 3.6 | 3.6 | 3.8 | 3.6 |
| | Average particle size [μm] | 1.5 | 2.2 | 2.2 | 2.4 | 2.3 | 2.6 | 2.5 | 2.7 |
| | (C) PES | — | — | — | — | — | — | — | — |
| | (D) PA | — | — | — | — | — | — | — | — |
| | Coating thickness [μm] | 35 | 35 | 35 | 35 | 35 | 35 | 35 | 35 |
| Overall coating thickness [μm] | | 104 | 104 | 105 | 105 | 105 | 105 | 105 | 105 |
| Wire outer appearance | | ○ | ○ | ○ | ○ | ○ | ○ | ○ | ○ |
| Heat resistance | Class F | ○ | ○ | ○ | ○ | ○ | ○ | ○ | ○ |
| | Class B | ○ | ○ | ○ | ○ | ○ | ○ | ○ | ○ |
| Dielectric breakdown voltage [kV] | | 25.5 | 25.5 | 24.5 | 18.7 | 24.3 | 27.6 | 26.8 | 26.0 |
| Crazing after solvent treatment | Xylene | Not observed | Not observed | Not observed | Not observed | Not observed | Not observed | Not observed | Not observed |
| | Styrene | Not observed | Not observed | Not observed | Not observed | Not observed | Not observed | Not observed | Not observed |
| | Ethanol | Observed | Observed | Observed | Not observed | Not observed | Not observed | Not observed | Not observed |
| | IPA | Observed | Observed | Observed | Not observed | Not observed | Not observed | Not observed | Not observed |
| Solderability [sec] | | ND | ND | ND | ND | ND | ND | ND | ND |

APPENDIX 1

TABLE 2

(continued from Table 1)

| | | Insulated wire sample | | | | | | | |
|---|---|---|---|---|---|---|---|---|---|
| | | 9 | 10 | 11 | 12 | 13 | 14 | 15 | 16 |
| Conductor | | Bare wire | Bare wire | Bare wire | Bare wire | Bare wire | Bare wire | Bare wire | Bare wire |
| Production line speed [m/min] | | 100 | 100 | 100 | 100 | 100 | 100 | 100 | 100 |
| Preliminary heating temperature [° C.] | | None | None | None | None | None | None | None | None |
| First layer | (C) PES | 100 | 100 | 100 | 100 | 100 | 100 | 100 | 100 |
| | PEI | — | — | — | — | — | — | — | — |
| | (D) PC | — | — | — | — | — | — | — | — |
| | PAR | — | — | — | — | — | — | — | — |
| | PA | — | — | — | — | — | — | — | — |
| | Coating thickness [μm] | 35 | 35 | 34 | 35 | 35 | 35 | 35 | 35 |
| Second layer | (C) PES | 100 | 100 | 100 | 100 | 100 | 100 | 100 | 100 |
| | PPS | — | — | — | — | — | — | — | — |
| | PEI | — | — | — | — | — | — | — | — |

TABLE 2-continued (continued from Table 1)

| | | Insulated wire sample | | | | | | | |
|---|---|---|---|---|---|---|---|---|---|
| | | 9 | 10 | 11 | 12 | 13 | 14 | 15 | 16 |
| | (D) PC | — | — | — | — | — | — | — | — |
| | PAR | — | — | — | — | — | — | — | — |
| | PA | — | — | — | — | — | — | — | — |
| | Coating thickness [μm] | 34 | 36 | 35 | 35 | 35 | 36 | 35 | 35 |
| Third layer | (A) PPS | 100 | 100 | 100 | 100 | — | 100 | — | 100 |
| | (B) Copolymer 1 | 20 | 30 | — | — | — | — | — | 40 |
| | Copolymer 2 | — | — | 10 | — | — | — | — | — |
| | Copolymer 3 | — | — | — | 10 | — | — | — | — |
| | (E) PA | — | — | — | 10 | — | — | — | — |
| | Tanδ (1 rad/s, 300° C.) | 3.6 | 3.3 | 3.8 | 3.8 | — | 231 | — | 2.9 |
| | Average particle size [μm] | 2.7 | 3.1 | 2.0 | 2.9 | — | — | — | 3.5 |
| | (C) PES | — | — | — | — | 100 | — | — | — |
| | (D) PA | — | — | — | — | — | — | 100 | — |
| | Coating thickness [μm] | 35 | 34 | 35 | 34 | 36 | 35 | 34 | 34 |
| Overall coating thickness [μm] | | 104 | 105 | 104 | 104 | 106 | 106 | 104 | 104 |
| Wire outer appearance | | ○ | ○ | ○ | ○ | ○ | ○ | ○ | ○ |
| Heat resistance | Class F | ○ | ○ | ○ | ○ | ○ | ○ | X | X |
| | Class B | ○ | ○ | ○ | ○ | ○ | ○ | X | ○ |
| Dielectric breakdown voltage [kV] | | 26.5 | 25.1 | 25.2 | 24.3 | 25.0 | 27.3 | 24.0 | 23.5 |
| Crazing after solvent treatment | Xylene | Not observed | Not observed | Not observed | Not observed | Crack | Observed | Not observed | Not observed |
| | Styrene | Not observed | Not observed | Not observed | Not observed | Crack | Observed | Not observed | Not observed |
| | Ethanol | Not observed | Not observed | Observed | Not Oberved | Observed | Observed | Not Observed | Not Observed |
| | IPA | Not observed | Not observed | Observed | Not Observed | Observed | Observed | Not Observed | Not Observed |
| Solderability [sec] | | ND | ND | ND | ND | ND | ND | ND | ND |

TABLE 3

(continued from Table 2)

| | | Insulated wire sample | | | | | | |
|---|---|---|---|---|---|---|---|---|
| | | 17 | 18 | 19 | 20 | 21 | 22 | 23 |
| Conductor | | Bare wire | Bare wire | Bare wire | Stranded wire | Bare wire | Bare wire | Bare wire |
| Production line speed [m/min] | | 100 | 100 | 100 | 100 | 100 | 100 | 100 |
| Preliminary heating temperature [° C.] | | None | None | None | None | None | None | None |
| First layer | (C) PES | 100 | 100 | 100 | 100 | 100 | 100 | 100 |
| | PEI | — | — | — | — | — | — | — |
| | (D) PC | 40 | 20 | 40 | 40 | 40 | 40 | 40 |
| | PAR | — | — | — | — | — | — | — |
| | PA | — | — | — | — | — | — | — |
| | Coating thickness [μm] | 34 | 36 | 35 | 35 | 35 | 35 | 34 |
| Second layer | (C) PES | 100 | 100 | 100 | 100 | 100 | 100 | 100 |
| | PEI | — | — | — | — | — | — | — |
| | (D) PC | 40 | 20 | 40 | 40 | 40 | 40 | 40 |
| | PAR | — | — | — | — | — | — | — |
| | PA | — | — | — | — | — | — | — |
| | Coating thickness [μm] | 35 | 35 | 35 | 34 | 35 | 34 | 36 |
| Third layer | (A) PPS | 100 | 100 | 100 | 100 | 100 | 100 | 100 |
| | (B) Copolymer 1 | 5 | 10 | 10 | 10 | 20 | 30 | 40 |
| | Copolymer 2 | — | — | — | — | — | — | — |
| | Copolymer 3 | — | — | — | — | — | — | — |
| | Tanδ (1 rad/s, 300° C.) | 4.2 | 3.9 | 3.9 | 3.9 | 3.6 | 3.3 | 2.9 |

TABLE 3-continued (continued from Table 2)

| | | Insulated wire sample | | | | | | |
|---|---|---|---|---|---|---|---|---|
| | | 17 | 18 | 19 | 20 | 21 | 22 | 23 |
| | Average particle size [μm] | 1.5 | 2.2 | 2.2 | 2.2 | 2.7 | 3.1 | 3.5 |
| | Coating thickness [μm] | 35 | 34 | 34 | 35 | 36 | 35 | 35 |
| Overall coating thickness [μm] | | 104 | 105 | 104 | 104 | 106 | 104 | 105 |
| Wire outer appearance | | ○ | ○ | ○ | ○ | ○ | ○ | ○ |
| Heat resistance | Class F | ND | ND | ND | ND | ND | ND | ND |
| | Class B | ○ | ○ | ○ | ○ | ○ | ○ | ○ |
| Dielectric breakdown voltage [kV] | | 24.5 | 25.5 | 24.5 | 26.5 | 25.2 | 25.2 | 23.5 |
| Crazing after solvent treatment | Xylene | Not observed | Not observed | Not observed | Not observed | Not observed | Not observed | Not observed |
| | Styrene | Not observed | Not observed | Not observed | Not observed | Not observed | Not observed | Not observed |
| Solderability [sec] | | 5.5 | 4.0 | 5.0 | 4.5 | 4.0 | 4.0 | 4.0 |

TABLE 4

(continued from Table 3)

| | | | Insulated wire sample | | | | | | |
|---|---|---|---|---|---|---|---|---|---|
| | | | 24 | 25 | 26 | 27 | 28 | 29 | 30 |
| Conductor | | | Bare wire | Bare wire | Bare wire | Bare wire | Bare wire | Bare wire | Bare wire |
| Production line speed [m/min] | | | 100 | 100 | 100 | 100 | 100 | 100 | 100 |
| Preliminary heating temperature [° C.] | | | None | None | None | None | None | None | None |
| First layer | (C) | PES | 100 | 100 | — | 100 | 100 | 100 | 100 |
| | | PEI | — | — | 100 | — | — | — | — |
| | (D) | PC | 40 | 40 | 40 | — | — | 40 | 40 |
| | | PAR | — | — | — | 40 | — | — | — |
| | | PA | — | — | — | — | 40 | — | — |
| | | Coating thickness [μm] | 35 | 34 | 34 | 36 | 35 | 34 | 36 |
| Second layer | (C) | PES | 100 | 100 | — | 100 | 100 | 100 | 100 |
| | | PEI | — | — | 100 | — | — | — | — |
| | (D) | PC | 40 | 40 | 40 | — | — | 40 | 40 |
| | | PAR | — | — | — | 40 | — | — | — |
| | | PA | — | — | — | — | 40 | — | — |
| | | Coating thickness [μm] | 34 | 35 | 35 | 35 | 36 | 36 | 35 |
| Third layer | (A) | PPS | 100 | 100 | 100 | 100 | 100 | 100 | 100 |
| | (B) | Copolymer 1 | — | — | 10 | 10 | 10 | — | 50 |
| | | Copolymer 2 | 10 | — | — | — | — | — | — |
| | | Copolymer 3 | — | 10 | — | — | — | — | — |
| | | Tanδ (1 rad/s, 300° C.) | 3.8 | 3.8 | 3.9 | 3.9 | 3.9 | 231 | 2.5 |
| | | Average particle size [μm] | 2.0 | 2.9 | 2.2 | 2.2 | 2.2 | — | 4.0 |
| | | Coating thickness [μm] | 36 | 36 | 35 | 35 | 35 | 35 | 34 |
| Overall coating thickness [μm] | | | 105 | 105 | 104 | 106 | 106 | 105 | 105 |
| Wire outer appearance | | | ○ | ○ | ○ | ○ | ○ | ○ | ○ |
| Heat resistance | | Class F | ND | ND | ND | ND | ND | ND | ND |
| | | Class B | ○ | ○ | ○ | ○ | ○ | ○ | X |
| Dielectric breakdown voltage [kV] | | | 24.3 | 25.4 | 23.6 | 23.5 | 25.0 | 24.0 | 24.0 |
| Crazing after solvent treatment | | Xylene | Not observed | Not observed | Not observed | Not observed | Not observed | Observed | Not observed |
| | | Styrene | Not observed | Not observed | Not observed | Not observed | Not observed | Observed | Not observed |
| Solderability [sec] | | | 5.0 | 5.5 | 5.5 | 5.0 | 5.0 | 5.0 | 4.5 |

The results shown in Tables 1 and 2 revealed the following.

In Sample 13, cracks occurred upon a solvent treatment; and in Sample 14, crazing occurred. In Sample 15, the heat resistance was not satisfied, since, for example, heat deterioration from the surface progressed.

On the other hand, the insulated wires obtained as Samples 1 to 3, 11, and 12 each exhibited good heat resistance and each had good solvent resistance against xylene and styrene. Further, the insulated wire obtained as Sample 7 had an improved solvent resistance against isopropyl alcohol and the insulated wires obtained as Samples 4 to 6 and 8 to 10 each had an improved solvent resistance against ethanol, and hence these each exhibited excellent solvent resistance. In Sample 16, although no crazing was observed after the solvent treatments, the severe heat resistance in Class F was not satisfied.

Further, the results shown in Tables 3 and 4 revealed the following.

In Sample 29, crazing occurred after a solvent treatment.

On the other hand, the insulated wires obtained as Samples 17 to 28 each exhibited good solderability and good heat resistance, and further each had good solvent resistance. In Sample 30, the heat resistance (Class B) was not satisfied, although solvent resistance was good.

INDUSTRIAL APPLICABILITY

The multilayer insulated wire of the present invention is excellent in industrial production and electrical characteristics, and it can be used, for example, in a transformer high in reliability, and it can be used in a wide variety of applications and fields. Further, the multilayer insulated wire of the present invention enables soldering to be directly performed at the time of terminal processing, thereby the workability can be significantly improved; and the insulated wire of the present invention can be used in winding processing and fields of the product thereof.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A multilayer insulated wire which comprises a conductor and two or more extrusion-insulating layers to cover the conductor, wherein at least one layer of the insulating layers other than an innermost layer is formed by a resin mixture containing a polyphenylene sulfide resin (A) as a continuous phase, and an olefin-based copolymer ingredient (B) and a polyamide (E) as a dispersed phase, wherein the resin mixture contains 15 to 30 parts by mass in the sum of the olefin-based copolymer ingredient (B) and the polyamide (E), and 100 parts by mass of the polyphenylene sulfide resin (A), and wherein an outermost layer of the insulating layers is formed by the resin mixture.

2. The multilayer insulated wire according to claim 1 includes at least one layer in an inner side of the insulating layer formed by the resin mixture containing the polyphenylene sulfide resin (A) as the continuous phase, and the olefin-based copolymer ingredient (B) and the polyamide (E) as the dispersed phase, wherein the inner-side layer is formed by at least one resin selected from a polyetherimide resin and a polyethersulfone resin.

3. The multilayer insulated wire according to claim 1 includes at least one layer in an inner side of the insulating layer formed by the resin mixture containing the polyphenylene sulfide resin (A) as the continuous phase, and the olefin-based copolymer ingredient (B) and the polyamide (E) as the dispersed phase, wherein the inner-side layer is formed by a polyethersulfone resin.

4. The multilayer insulated wire according to claim 1 includes at least one layer in an inner side of the insulating layer formed by the resin mixture containing the polyphenylene sulfide resin (A) as the continuous phase, and the olefin-based copolymer ingredient (B) and the polyamide (E) as the dispersed phase, wherein the inner-side layer is formed by a polyetherimide resin.

5. The multilayer insulated wire according to claim 1 includes the insulating layer formed by the resin mixture containing the polyphenylene sulfide resin (A) as the continuous phase, and the olefin-based copolymer ingredient (B) and the polyamide (E) as the dispersed phase, wherein the resin mixture contains the polyphenylene sulfide resin (A) as the continuous phase, and the olefin-based copolymer ingredient (B) having an average particle size in the range of from 0.01 to 5 μm as the dispersed phase.

6. The multilayer insulated wire according to claim 1, wherein an inner layer closest to the outermost layer is formed by the resin mixture.

7. The multilayer insulated wire according to claim 1, which comprises three layers, wherein an intermediate layer is formed by the resin mixture, and an innermost layer is formed by at least one resin selected from a polyetherimide resin and a polyethersulfone resin.

8. The multilayer insulated wire according to claim 1, which comprises three layers, wherein an intermediate layer and an innermost layer are each formed by at least one resin selected from a polyetherimide resin and a polyethersulfone resin.

9. The multilayer insulated wire according to claim 1, which includes at least one layer in an inner side of the insulating layer formed by the resin mixture containing the polyphenylene sulfide resin (A) as the continuous phase, and the olefin-based copolymer ingredient (B) and the polyamide (E) as the dispersed phase, wherein the inner-side layer is formed by a resin dispersion obtained by mixing 10 to 100 parts by mass of at least one resin (D) selected from a polycarbonate resin, a polyarylate resin, a polyester resin, and a polyamide resin, with 100 parts by mass of at least one resin (C) selected from a polyetherimide resin and a polyethersulfone resin.

10. The multilayer insulated wire according to claim 9, wherein the resin (C) is a polyethersulfone resin.

11. The multilayer insulated wire according to claim 9, wherein the resin (C) is a polyetherimide resin.

12. The multilayer insulated wire according to claim 9, wherein the resin (C) is a polycarbonate resin.

13. The multilayer insulated wire according to claim 9, wherein the resin (C) is a polyethersulfone resin, and the resin (D) is a polycarbonate resin.

14. The multilayer insulated wire according to claim 9, wherein the resin dispersion is obtained by mixing 10 to 70 parts by mass of the resin (D) and 100 parts by mass of the resin (C).

15. The multilayer insulated wire according to claim 1, wherein the polyphenylene sulfide resin (A) has an initial value of tan δ (loss modulus/storage modulus) of 1.5 or more in nitrogen, at 1 rad/s, and at 300° C.

16. The multilayer insulated wire according to claim 1, wherein the olefin-based copolymer ingredient (B) is a copolymer comprising an olefin portion and an unsaturated glycidyl carboxylate portion.

17. The multilayer insulated wire according to claim 1, wherein the olefin-based copolymer ingredient (B) is a copolymer comprising at least one of an acrylic portion and a vinyl portion, an olefin portion, and an epoxy group-containing compound portion.

18. The multilayer insulated wire according to claim 1, wherein the olefin-based copolymer ingredient (B) is a copolymer comprising at least one of an acrylic portion and a vinyl portion, an olefin portion, and an unsaturated glycidyl carboxylate portion.

19. The multilayer insulated wire according to claim 1 comprises the resin mixture containing the polyphenylene sulfide resin (A) as the continuous phase, and the olefin-based copolymer ingredient (B) as the dispersed phase, wherein the resin mixture has an initial value of tan δ (loss modulus/storage modulus) of 1.5 or more in nitrogen, at 1 rad/s, and at 300° C.

20. A transformer, wherein the multilayer insulated wire according to claim 1 is used.

21. The multilayer insulated wire according to claim 1, wherein the olefin-based copolymer ingredient (B) is a copolymer having an epoxy-containing compound portion, or a copolymer comprising an olefin portion and an epoxy group-containing compound portion.

22. The multilayer insulated wire according to claim 1, wherein the olefin-based copolymer ingredient (B) is a copolymer having a carboxylic anhydride group-containing compound portion, or a copolymer comprising an olefin portion and a carboxylic anhydride group-containing compound portion.

* * * * *